June 8, 1926.

R. C. M. HASTINGS

SYSTEM AUTOMATIC SELECTIVE TELEPHONY

Original Filed May 24, 1919    11 Sheets-Sheet 1

Inventor
R. C. M. Hastings
By [signature]
Attorney

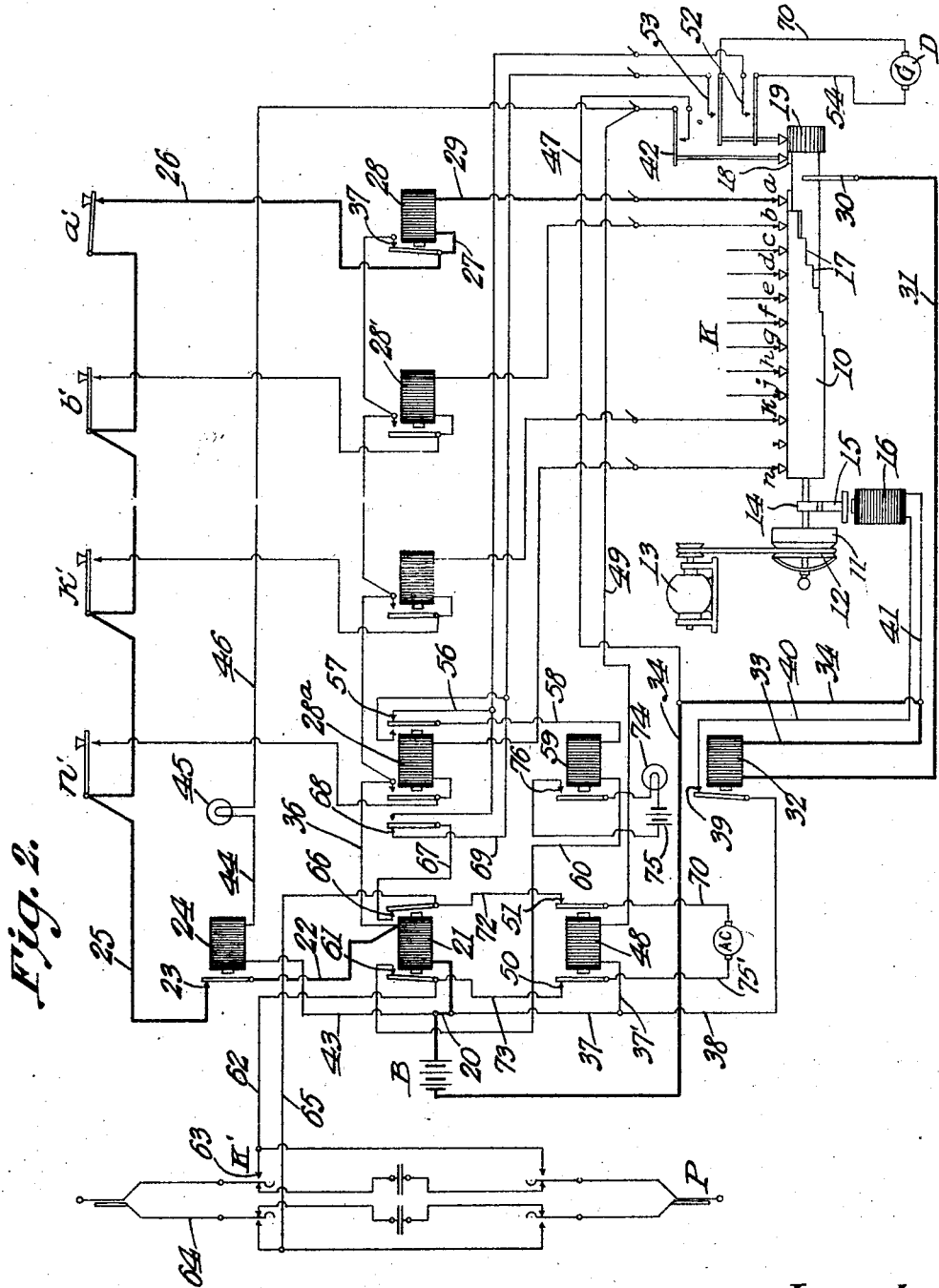

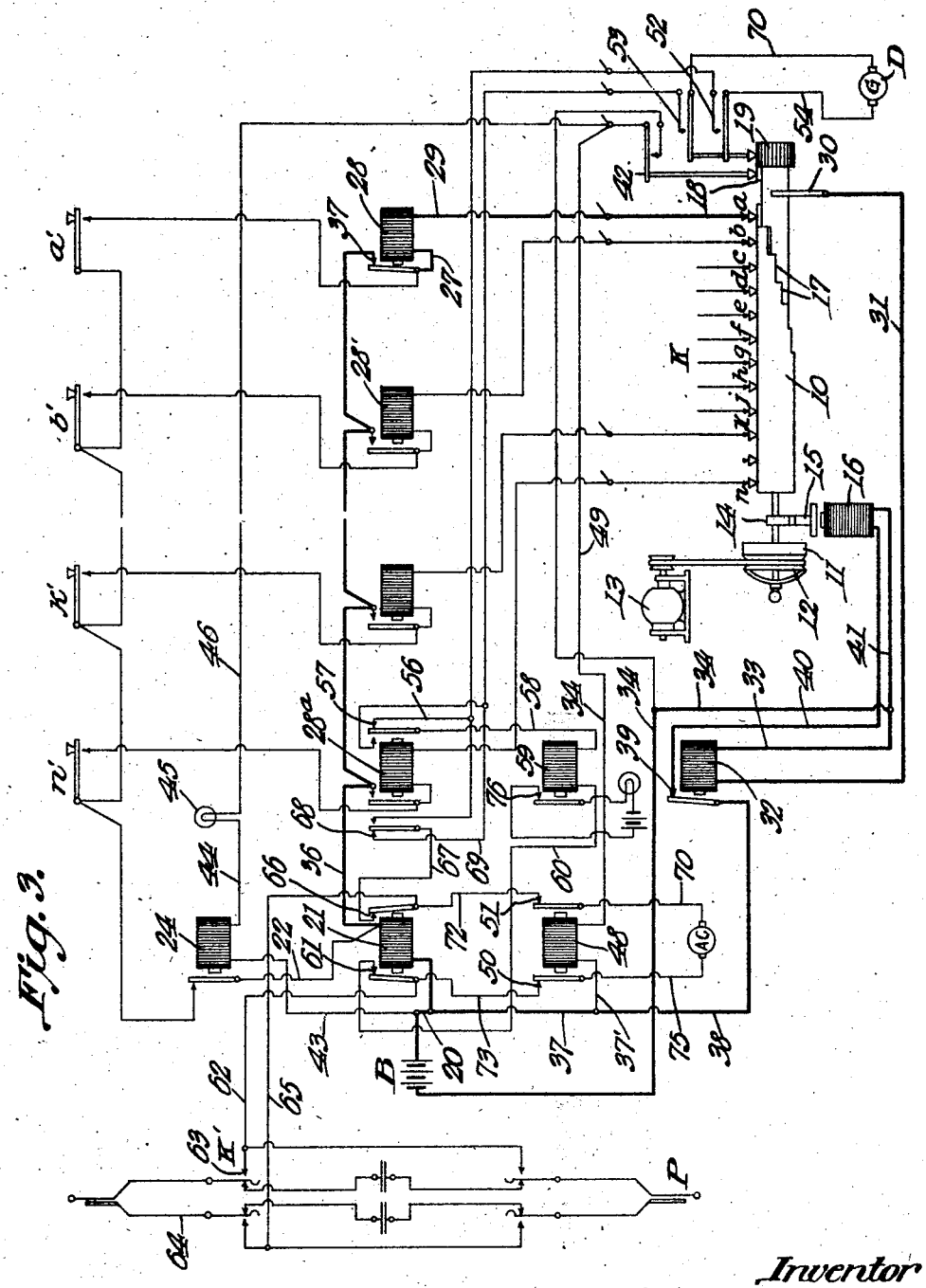

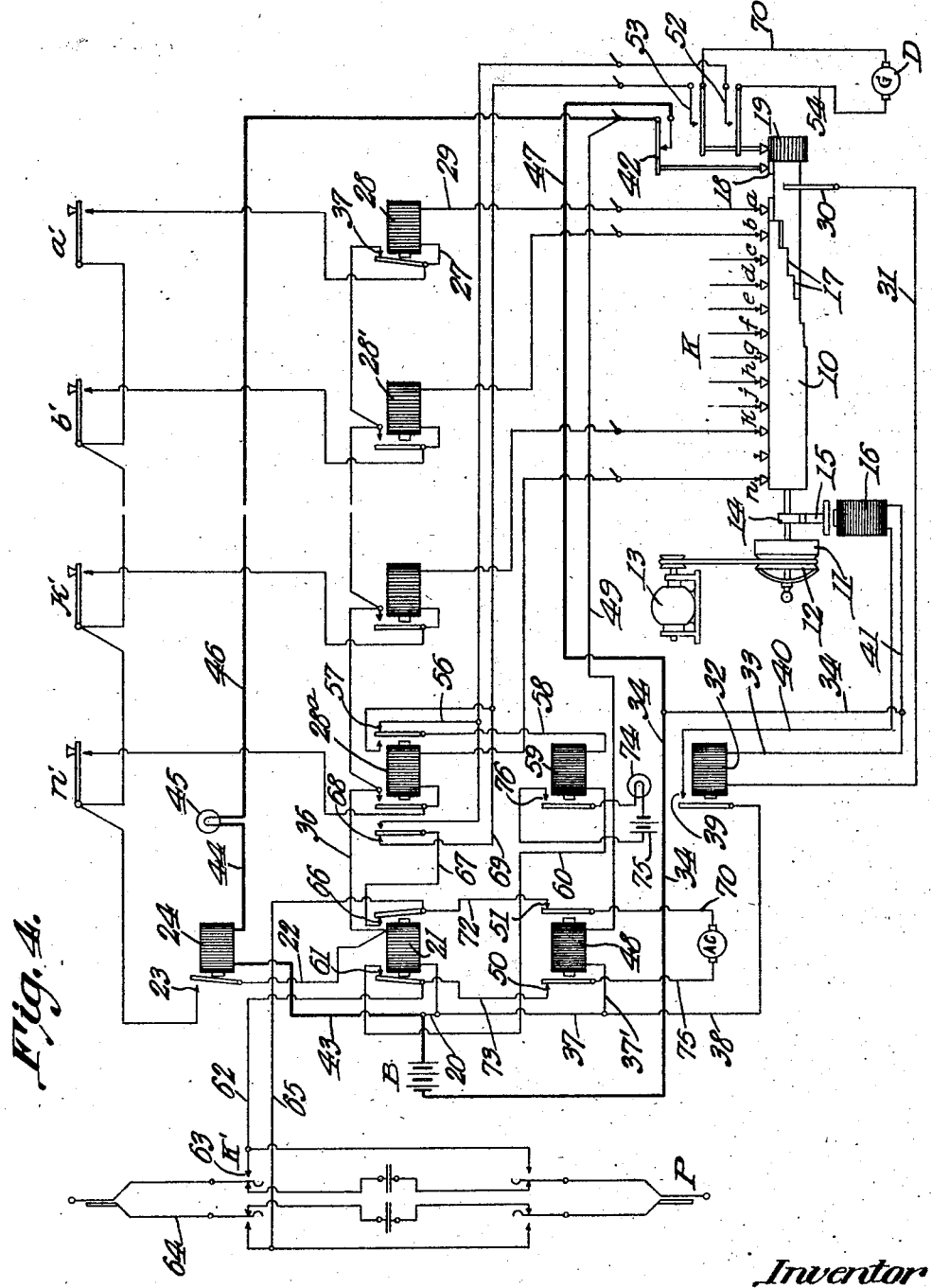

June 8, 1926.
R. C. M. HASTINGS
1,588,108
SYSTEM AUTOMATIC SELECTIVE TELEPHONY
Original Filed May 24, 1919    11 Sheets-Sheet 5
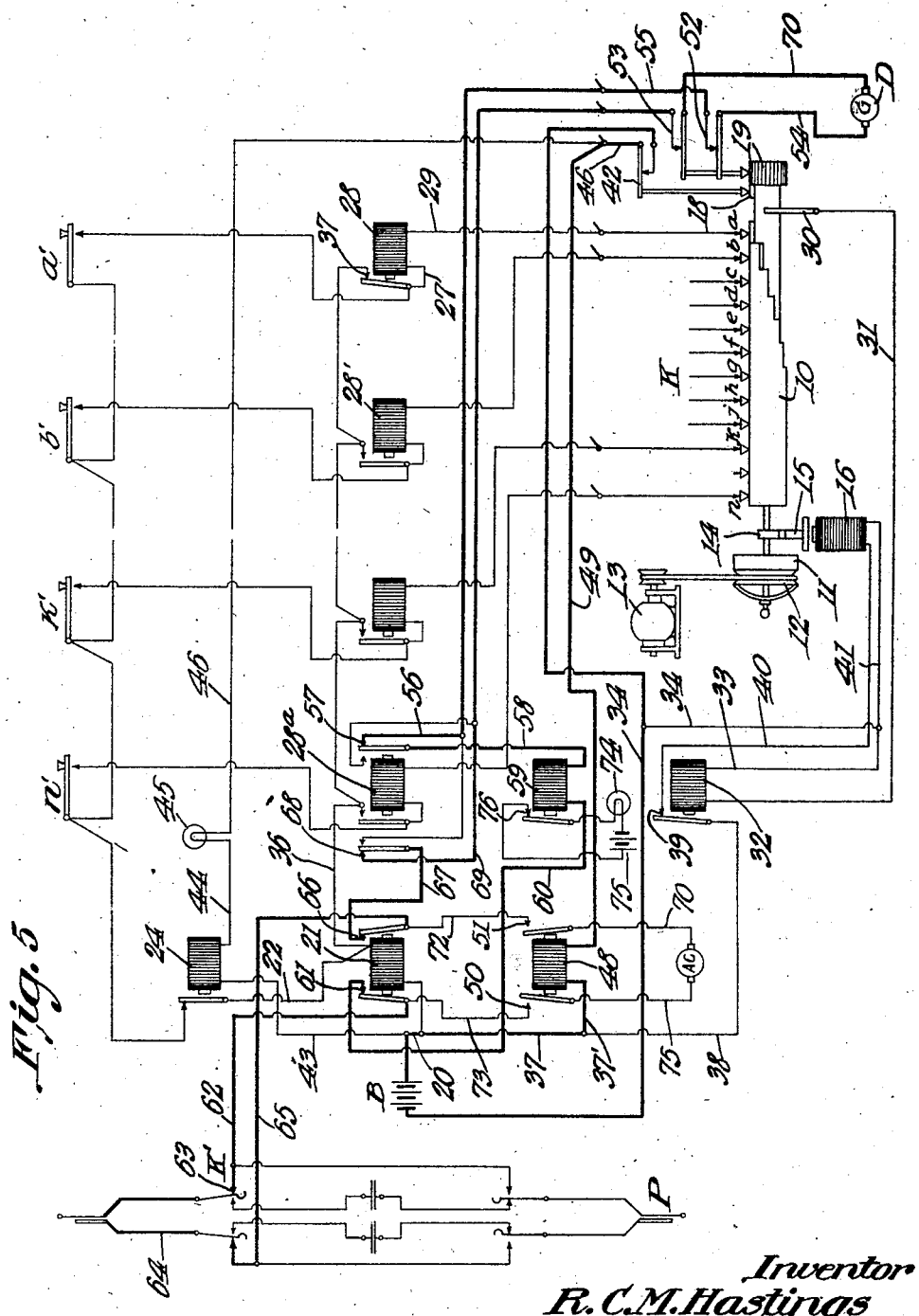
Inventor
R.C.M.Hastings
By  Davis Pelton Moore
Attorney June 8, 1926. 1,588,108
R. C. M. HASTINGS
SYSTEM AUTOMATIC SELECTIVE TELEPHONY
Original Filed May 24, 1919   11 Sheets-Sheet 6
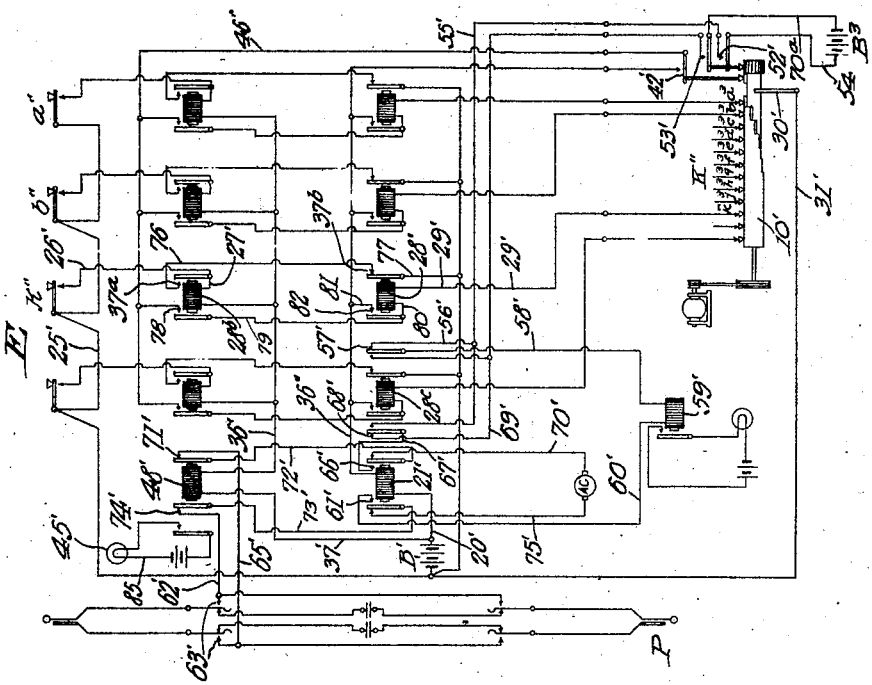
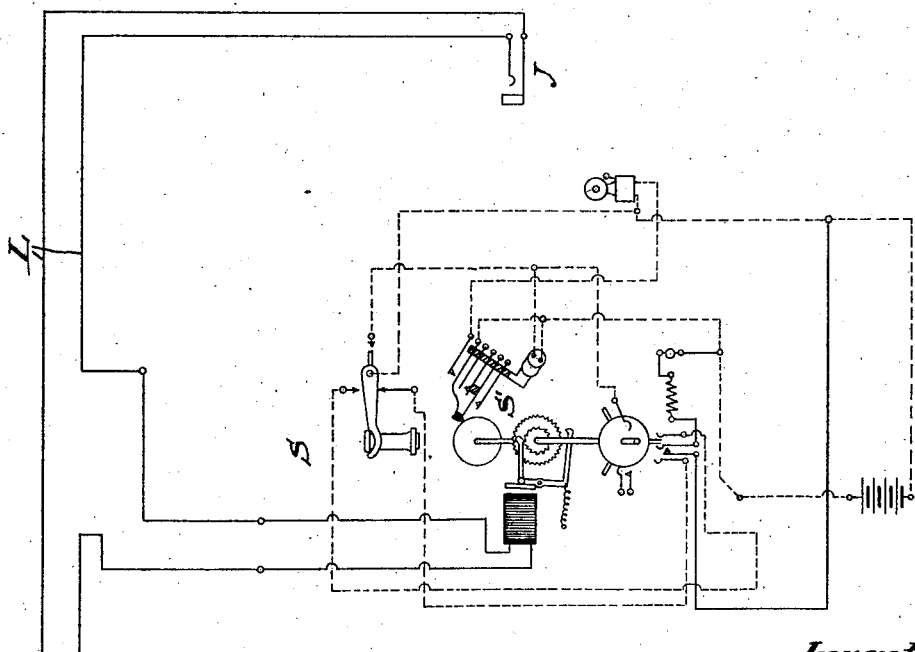
Inventor
R.C.M. Hastings
By
Attorney

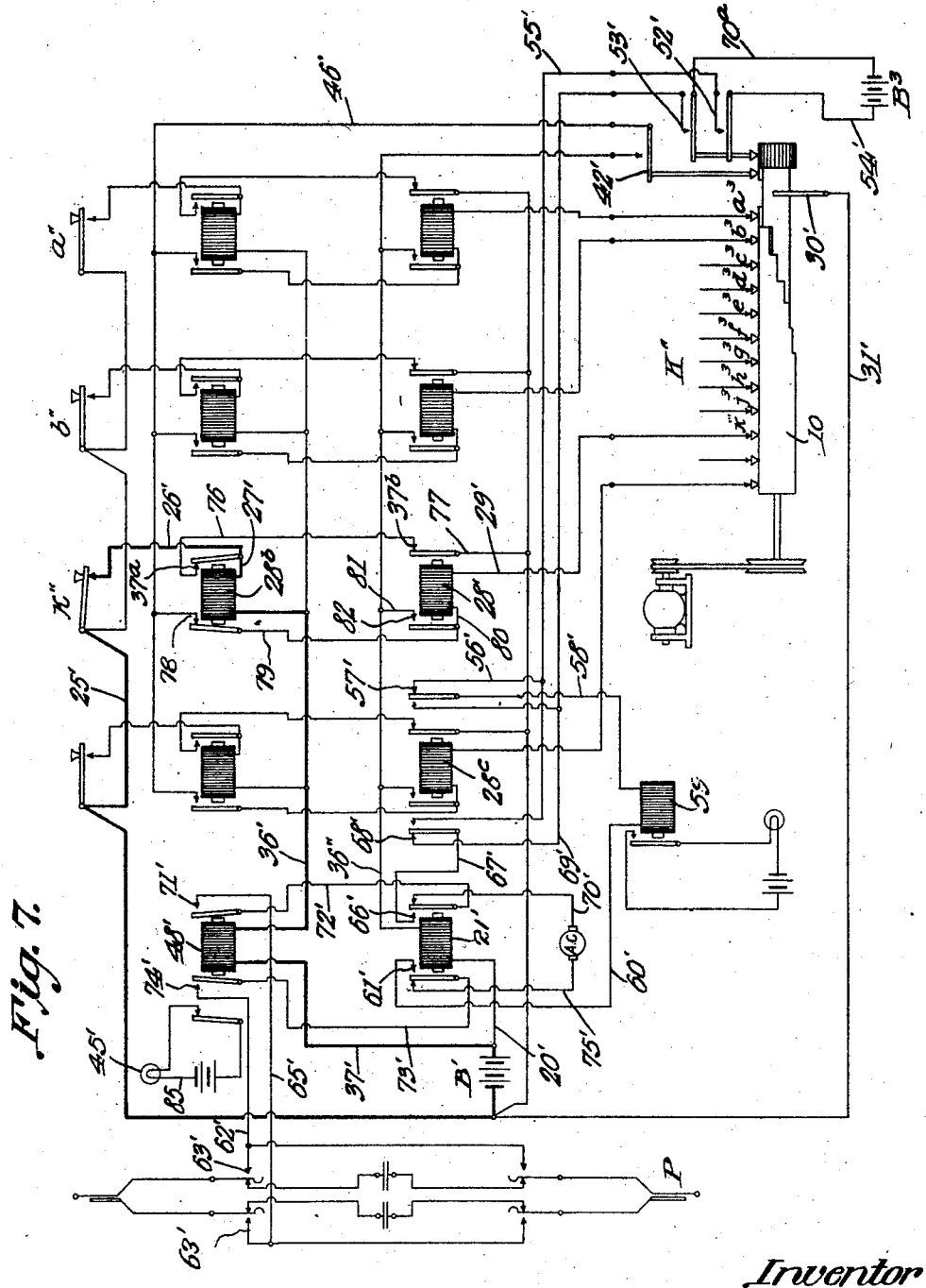

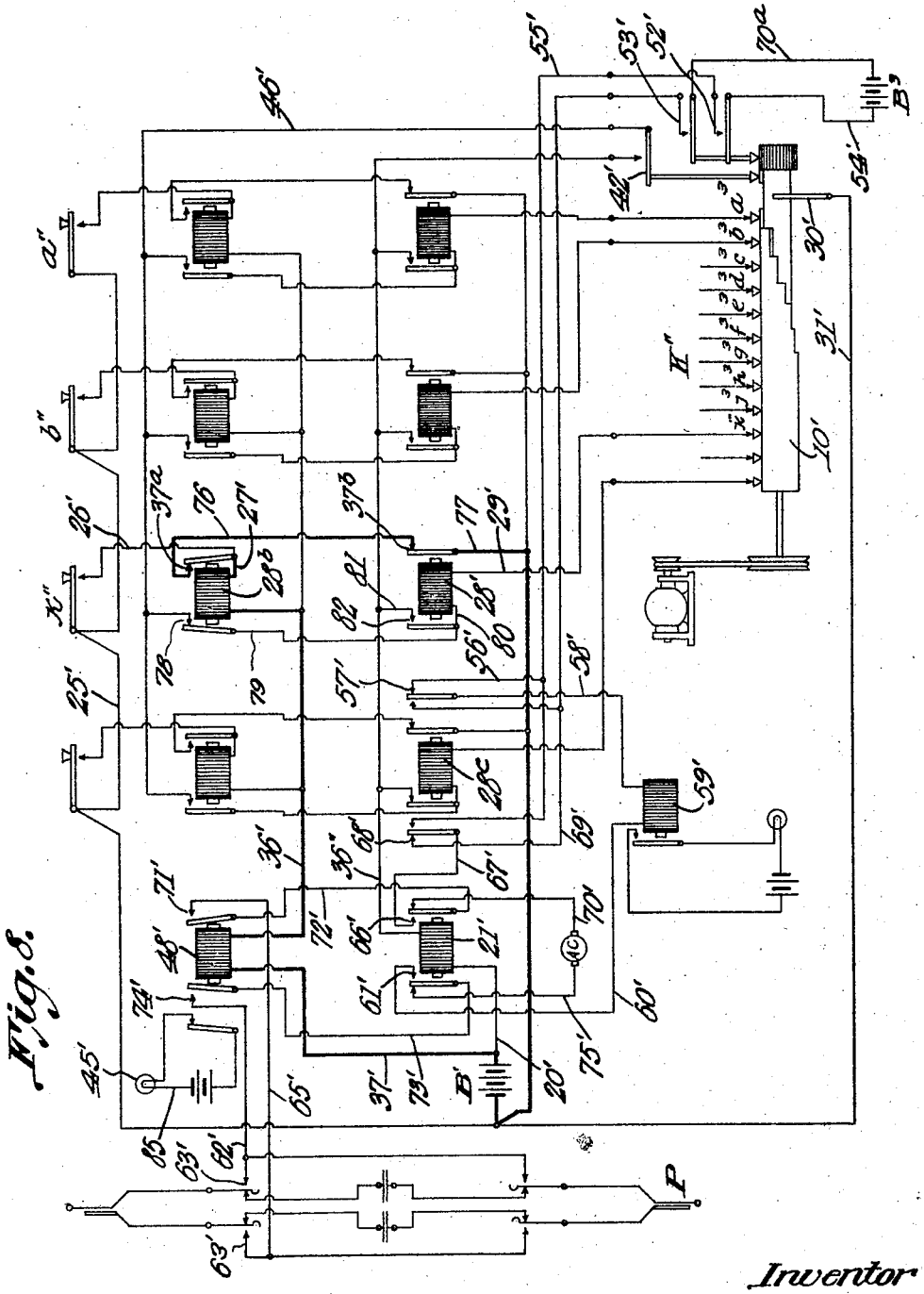

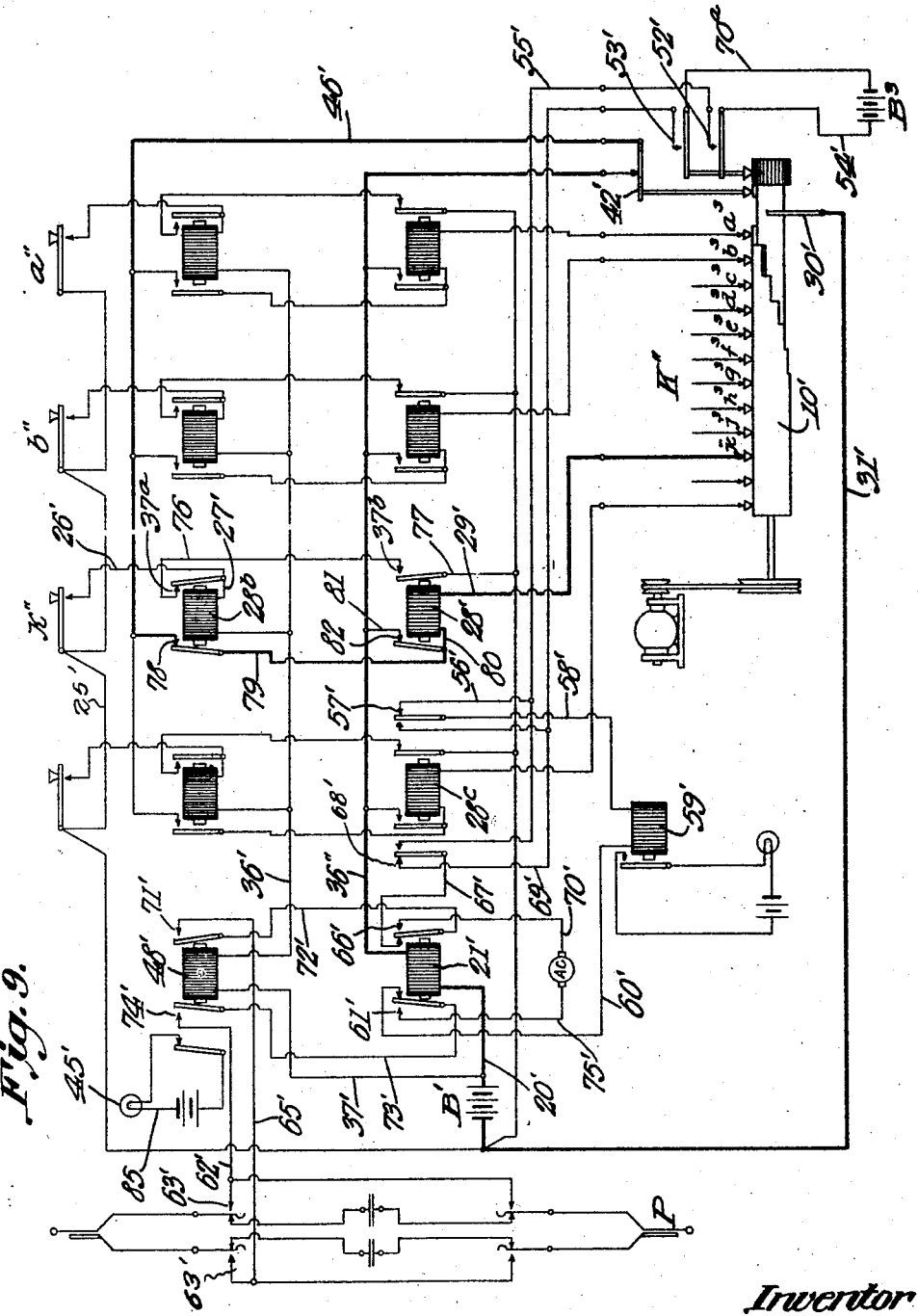

June 8, 1926.
R. C. M. HASTINGS
1,588,108
SYSTEM AUTOMATIC SELECTIVE TELEPHONY
Original Filed May 24, 1919    11 Sheets-Sheet 10
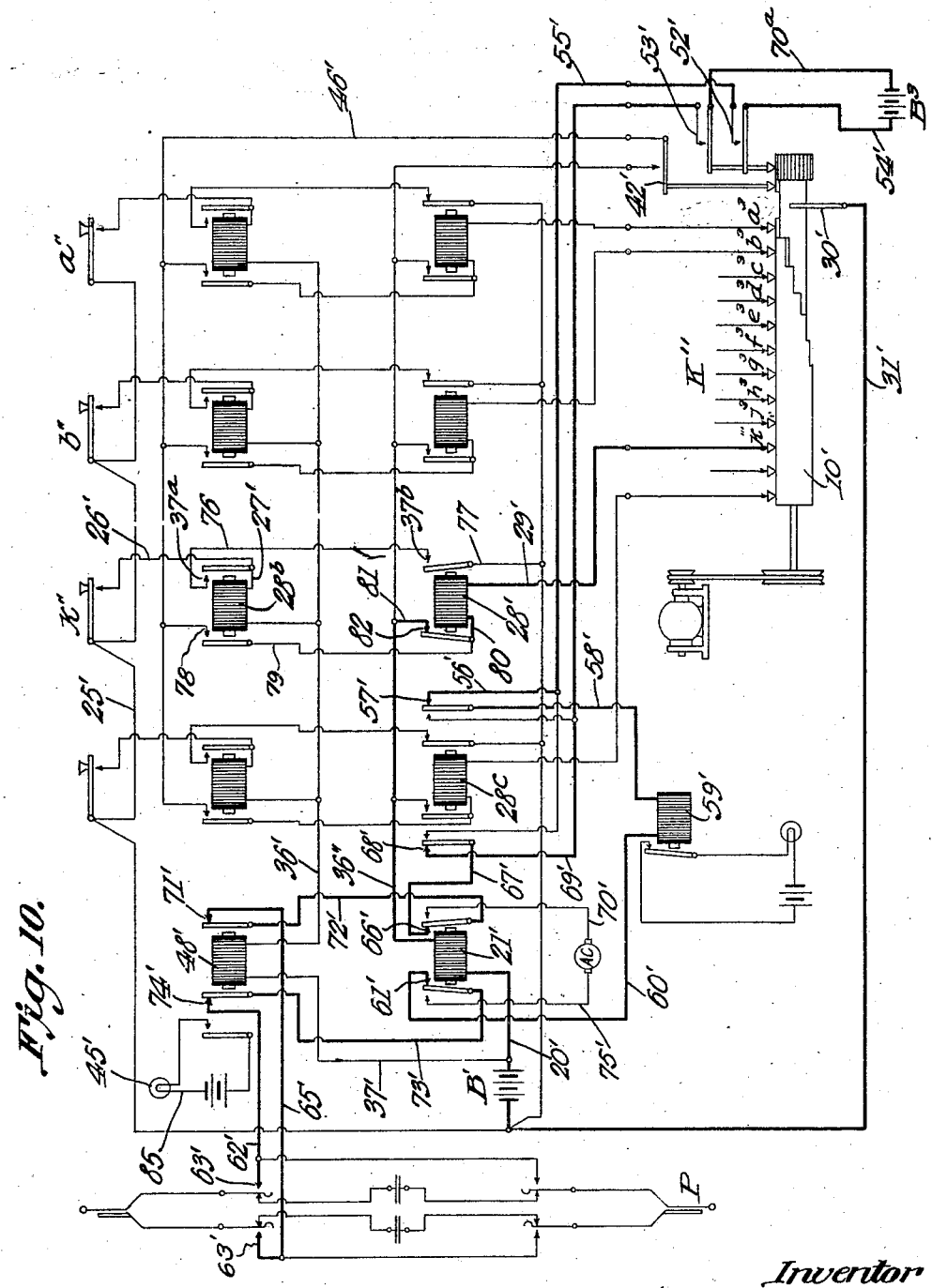
Inventor
R.C.M. Hastings
By
Attorney June 8, 1926.
R. C. M. HASTINGS
1,588,108
SYSTEM AUTOMATIC SELECTIVE TELEPHONY
Original Filed May 24, 1919
11 Sheets-Sheet 11
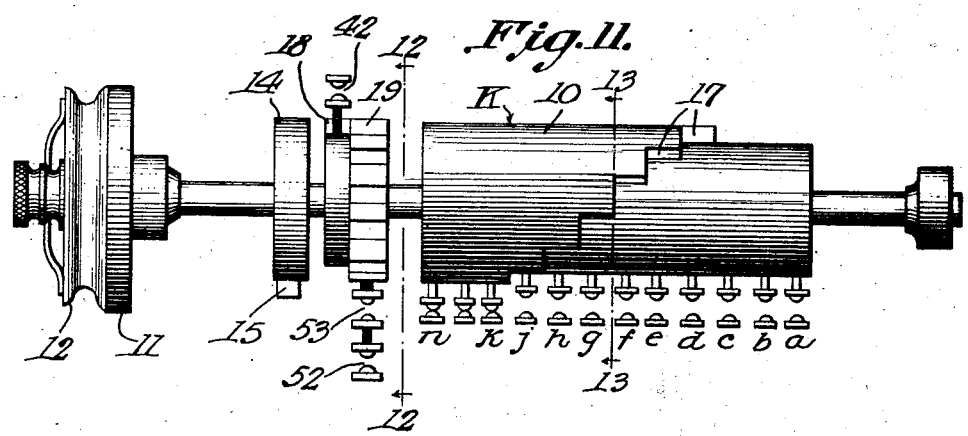
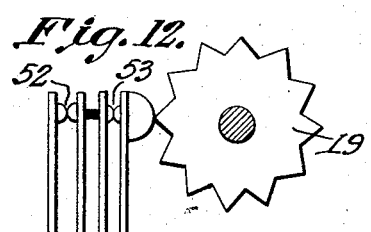
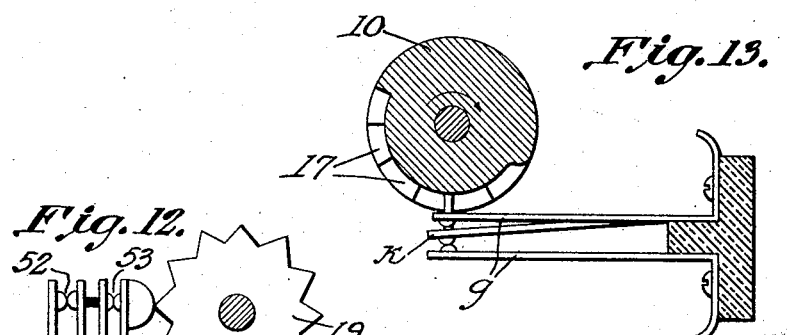
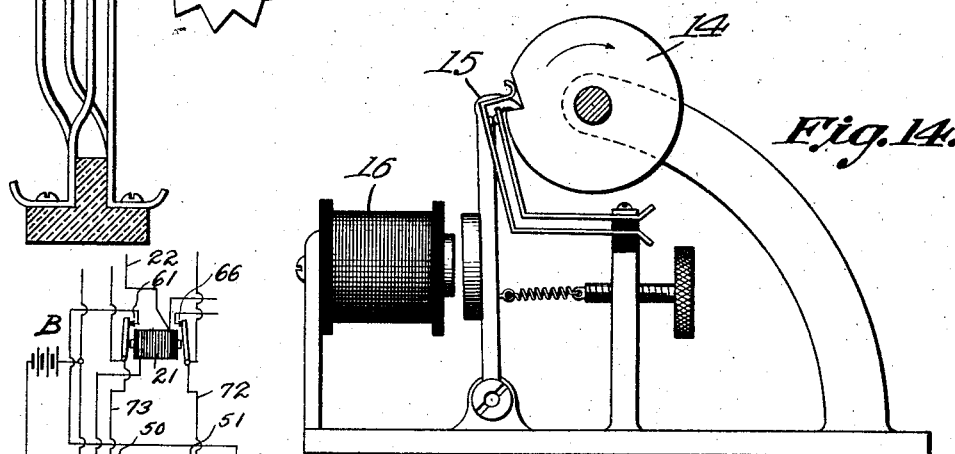
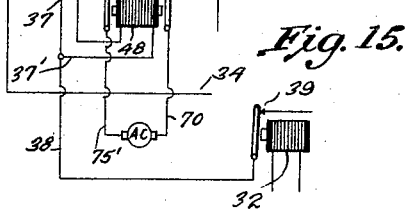
Inventor
R. C. M. Hastings
By David Pelton Moore
Attorney Patented June 8, 1926.

1,588,108

UNITED STATES PATENT OFFICE.

RUBEN C. M. HASTINGS, OF COLUMBUS, OHIO; ELIZABETH F. HASTINGS EXECUTRIX OF THE WILL OF SAID R. C. M. HASTINGS, DECEASED.

SYSTEM AUTOMATIC SELECTIVE TELEPHONY.

Application filed May 24, 1919, Serial No. 299,555. Renewed November 13, 1925.

This invention relates to improvements in a system of automatic selective telephony, one object of the invention being the provision of a master selecting key and adjacent mechanism especially adapted for use in connection with my various systems of automatic selective telephony, as set forth in my United States Patents No. 1,061,285 reissued Sept. 28, 1915, No. 13,989, and No. 1,061,287, simplifying the mechanism and construction of the selective key set forth in my United States Patent No. 1,061,256, and simplifying the exchange switchboard.

A further object of my invention is the provision of a master selecting key which is adapted for use in conjunction with any form of switchboard now in use and which in conjunction with selecting devices as set forth in the above mentioned patents of my own, and particularly the sub-stations, can be used with any number of party line sets, that is, can connect a single line telephone to any one of a party line set or any one in one party line set with another one in another party line set.

A still further object of this invention is the provision of a master selecting key and its apparatus, whereby after the insertion of the answering plug and the insertion of the calling plug the simple depression of a key will cause impulses to be transmitted through the line and select any given called sub-station, shunting the remaining ones from the line, except the calling sub-station, and at the same time, isolate the call-up mechanism at the exchange so that the current therefrom cannot possibly interfere with the impulses for operating the step-by-step device in the sub-station.

A still further object of this invention is the provision of mechanism in conjunction with the selector key which restores all mechanisms to normal or zero position at the end of the conversation by a simple removing of the jack plug or the depression of a key, or by the operation of the supervisory relays.

With the foregoing and other objects in view, which will appear as the description proceeds, the invention resides in the combination and arrangement of parts and in the details of construction hereinafter described and claimed, it being understood that changes in the precise embodiment of the invention herein disclosed can be made without departing from the spirit of the invention.

In the accompanying drawings:

Figure 1 is a diagrammatic view of a complete selective telephone system embodying the present invention, one sub-station and the complete exchange being shown, and the parts being in normal position.

Figure 2 is an enlarged diagrammatic view of the exchange as shown in Figure 1, heavy lines indicating circuit #1 when one of the calling buttons have been depressed.

Figure 3 is a view similar to Figure 2, showing in heavy lines circuit #2 upon the release of the previously depressed button, the magnet releasing circuit for the master selecting key also being shown in heavy lines, as circuit #3.

Figure 4 is a view similar to Figure 2, showing circuit #4 is heavy lines.

Figure 5 is a view similar to Figure 2, showing circuit #5 in heavy lines, circuit #6 also being shown in heavy lines in this view.

Figure 6 is a view similar to Figure 1, in which the exchange has a continuously rotating selecting member or barrel.

Figure 7 is a view similar to Figure 2, with the exchange station shown in Figure 6, with its circuit #1 in full lines.

Figure 8 is a view similar to Figure 6, showing circuit #2 in full lines.

Figure 9 is a view similar to Figure 6, showing circuit #3 in full lines.

Figure 10 is a view similar to Figure 6, showing circuits #4 and #5 in full lines.

Figure 11 is a detail and enlarged view of the rotary barrel or selecting member.

Figure 12 is a section taken on line 12—12 of Figure 11.

Figure 13 is a section taken on line 13—13 of Figure 11.

Figure 14 is an end view of the rotary barrel showing the magnet, control lock and release, and means whereby the magnet 16 may be controlled so as to be only momentarily energized when brought into play.

Figure 15 is a diagrammatic view of a part of a circuit showing the magnet 48 connected in series with magnet 21.

In describing the present invention, the apparatus as shown in Figures 1 through 5 will be described first.

Referring particularly to Figure 1, E designates the exchange, S the sub-station and L the line wires, the answering and calling jacks, J and J' being illustrated, while the detail construction of the sub-station S is identical with that set forth in my U. S. Patent No. 1,334,452, dated March 23, 1920.

Referring particularly to the exchange, there is located the master selecting key K, which comprises a rotative barrel 10 having mounted at one end a friction wheel 11 and a freely rotatable spring actuated friction pulley 12, operated by the motor 13. Mounted upon the shaft of the barrel 10, is a ratchet wheel 14, provided with a single tooth and disposed to be acted upon by the armature ratchet 15 which normally holds the barrel 10 against rotation so that continued rotation of the motor 13 merely rotates the pulley 12. The magnet 16, as will presently appear, is disposed to operate the armature ratchet 15.

This barrel 10 is composed of a body portion having a plurality of cams or steps 17 so disposed as to operate and control, as will presently appear, the contacts or spring opened switches $a$, $b$, $c$, $d$, $e$, $f$, $g$, $h$, $j$ and $k$, here shown ten in all but which may be of any desired number, these switches being normally held closed at zero position and while the barrel is locked by the armature ratchet. These switches are opened in succession, as will presently appear.

By means of the circuits controlled by these switches, the required number of impulses are transmitted to the line due to the two switches 52 and 53, connected to the ringing leads of the ringing keys $k'$ so that the impulses are sent through cord circuits to the line.

This barrel 10 is further provided with a cam 18, so disposed as to operate a non-interfering circuit through the contact 42 and the relay 24. A further cam 19 is provided and operated by the barrel to cause the contacts 52 and 53 to be opened and closed so that the intermittent impulses are sent out upon the line with reverse polarity, which is due to the action of relay $28^a$ which is controlled by this cam and its contact $n$.

The very circuits controlling these circuits are in turn controlled by a series of push buttons $a'$, $b'$, $k'$.

With easy reach of the operator and are completed through and are continued through a series of selecting relays, 28 28'.

Where desired and as shown, another circuit permitting the operator to return the selected instruments to zero or normal position is included in this system, requiring an additional button $n'$ with its controlling relay $28^a$.

The energization of any of these relays, 28, 28' or $28^a$, brings about the action of the limiting relay 21 and the cut-off relay 43, which controls the number of impulses sent out over the line and also the cutting off of the ringing current during the selecting operation.

This system is so designed that the master selecting key and its control relay 32 may be connected common to an exchange while the button and other relays are connected in each operator's position and are common to all of the cords of that position. This is accomplished by branch lines leading from the proper wires as indicated in Figures 1, 2, 3, 4 and 5. The operation of the present system does not differ materially from the general operation of a non-selecting exchange, except that the operator must press a button $a'$, to start the selecting operation. The present apparatus may be added to any standard switchboard of the manually operated type without radical changes in the circuits thereof, with the further advantage that with the small number of parts added that require the operator's use and attention, consisting of one more button than the maximum selective party line capacity on that position, and two pilot lamps, as will presently appear.

In order that the present system may be fully understood, let us assume that the operator is selecting sub-station No. 1 on the line. The operator will insert the plug P of the cord circuit in the line jack J, as ordinarily. Then the ringing key to that cord circuit is thrown and button $a'$ pressed.

*Circuit #1* (see Figure 2).—The depression of the key $a'$ closes the following circuit which includes the battery B, the conductor 20, the impulse relay 21, the conductor 22, the contact or switch 23 of the relay 24, the conductor 25, the button $a'$, the conductors 26 and 27, the coil of the selecting relay 28, the conductor 29, the contact $a$ of the selecting key K, the barrel 10 of said key, the brush 30, the conductor 31, the clutch magnet relay 32, the conductor 33, the conductor 34 to the battery B. It will thus be seen that this circuit causes the energization of relays 21, 28 and 32.

*Circuit #2* (see Figure 3).—Upon the release of the button $a'$ the energization of the relays 21, 28 and 32 are continued through the following circuit which includes the battery B, the conductor 20, the relay 21, the conductor 36, the contact or switch 37 controlled by the coil 28, the same being closed due to the energization by the preceding circuit #1, the conductor 27, the coil 28, the conductor 29, the contact $a$, the barrel 10 of the selecting key, the brush 30, the conductor 31, the relay 32, the conductor 33, the conductor 34 to the battery.

It will thus be noted that the energization of the relay 21 cuts the selective circuit across the ringing leads at contacts 61 and 66 by circuit #6, as will presently appear.

The energization of the relay 28 holds the circuit #2 closed until the rotation of the barrel 10 of the selector key breaks the circuit at contact a.

*Circuit #3* (see Figure 3).—The energization of the relay 32 closes the following circuit, which includes the battery B, the conductors 20, 37, and 38, the contact or switch 39 of the relay 32, the conductor 40, the clutch controlling relay or magnet 16, and the conductor 41 and 34 to the battery.

By energizing the electro-magnet 16 the armature ratchet 15 is held outwardly and away from the ratchet wheel 14 until the opening of the circuit #2, which is controlled by contact a and is held closed until the barrel 10 rotates thru one complete step at which time the contact a is opened and circuit #3 is also opened so that the electro-magnet 16 is de-energized to permit the armature ratchet to engage the wheel 14 and halt barrel 10 at the completion of the revolution.

*Circuit #4* (see Figure 4).—The rotation of the barrel 10 first closes contacts 42 and completes the following circuit, consisting of the battery B, the conductor 43, the coil lock-out noninterfering relay 24, the conductor 44, pilot lamp 45, the conductor 46, the contact 42, the conductors 47 and 34 to the battery. The energization of the relay 24 causes the opening of the circuit #1 to the button a' at the contact or switch 23, thus preventing further selections by any operator until the barrel 10 of the selecting key has completed one revolution and is again halted or at zero position.

*Circuit #5* (see Figure 5).—This circuit is controlled by the contact 42 of the selecting key and closes the cut-off circuit which is as follows: the battery B, the conductors 20, 37 and 37', the relay 48, the conductors 49 and 46, the contact 42, the conductor 34 to the battery.

This circuit opens the generator circuit at contacts 50 and 51 of the relay 48, preventing the ringing until the selection is performed and during the rotation of the barrel 10 or until such barrel has completed a single revolution.

*Circuit #6* (see Figure 5).—The remaining contacts or switches 52 and 53 at the selective key close and immediately thereafter open sending one impulse out on the line through the following circuit, which includes the dynamo D, the conductor 54, the contact 52, the conductors 55 and 56, the contact or switch 57 of the coil 28ª, the conductor 58, the pilot lamp relay 59, the conductor 60, the contact or switch 61 of the relay 21, the conductor 62, the ringing contacts 63 on the ringing key K', thence on the line L and return through cord 64 of which the operator has the key thrown, to the conductor 65, the contact 66, of the relay 21, the conductor 67, the contact 68 of the relay 28ª, the conductor 69, the contact or switch 53, and the conductor 70 to the dynamo.

At the completion of this contact a the circuit #2 is opened and through it circuit #3 is also opened. This action causes the de-energization of relays 28, 21, 32 and 16.

The de-energization of the relay 21 removes the selective circuit from the ringing leads and prevents further impulses from going out on to the line L. The de-energization of the coil 16, as before stated, releases the armature ratchet 15 so that the barrel 10 is halted at the completion of the revolution and when this occurs the contact 42 is opened, causing the de-energization of relays 48 and 24.

*Circuit #7* (see Figure 4).—The de-energization of the relay 48 connects the generator G to the ringing leads and the circuit is as follows: The generator G, the conductor 70, the contact or switch 51 controlled by the relay 48, the conductors 72 and 65, the ringing contact 63, thence out on the line and return through the cord, of which the operator has the key thrown, to the conductors 62 and 73, the contact 50 of the relay 48, and the conductor 75 to the generator.

To restore the elements to normal condition, the operator by touching the key n' closes all of the circuits similar to those controlled by the key a' but in addition reverses the polarity of the selecting circuit with respect to the ringing leads at contacts 57 and 68, due to the energization of the relay 28ª. This action sends a number of impulses out on the line as before stated, of reverse polarity to insure the restoring of all sub-stations S to zero position.

At the completion of one revolution of the barrel 10, as before stated, all of the circuits at the exchange are opened.

This lock-out pilot lamp 45 is energized on every position every time the barrel 10 rotates, continuing to be energized until the same stops—thus indicating to the operator that a selection is in progress and that she is to hold down the desired button until the lamp is extinguished at the zero position and relighted by the further rotation of the barrel by the action of the button she is pressing.

The impulse pilot lamp 74 on the switchboard selecting flashes once every impulse sent out upon the line, indicating to the operator the number of impulses being sent to the line and serving as a check on the connection so that the operator will understand whether or not she is in error. This circuit includes the battery 75, the armature switch 76 controlled by the relay 59, and the lamp 74.

If desired, the relay 48 (Fig. 15) may be connected in series with the relay coil 21, to operate only when its switchboard position is in use. By this means it is impossible for an operator to cut off the ringing by another operator on boards where the selecting call system is used by several operators, or where traffic is heavy.

It is also possible that the magnet 16 (Fig. 14) may be so connected to an extra contact on the barrel 10 so as to be cut out of the circuit and de-energized as soon as the barrel 10 starts to revolve as the ratchet wheel 14 is provided with one tooth and when released will revolve one rotation in any event. By this means considerable current may be saved.

In the arrangement of the apparatus as shown in Figures 6 through 10, the barrel 10' of the key K'' is a continuously rotating member and the circuits controlled by the contacts $a'''$ to $j'''$ and the buttons $a''$, $b''$, $c''$, etc., are so arranged that the circuits are normally open and no impulses are sent to the line.

*Circuit #1$^a$* (see Figure 7).—In this instance, as shown in Figure 7, the depression of the button $k''$, closes the following circuit, which includes the battery B', the conductor 37', the relay 48', the conductor 36'', the holding relay 28$^b$, the conductors 27' and 26', the button $k''$, and the conductor 25'. Thus the coils 48' and 28$^b$ are simultaneously energized.

The energization of the coil 48' cuts the ringing and selecting circuits from the ringing leads 62' and 65' at the contact switches 71' and 74'.

*Circuit #2$^a$* (see Figure 8).—Upon the release of button $k''$ this circuit for energizing the coils 28$^b$ and 48' is continued and is as follows: the battery B', the conductor 37', the coil 48', the conductor 36', the coil 28$^b$, the conductor 27', the contact 37$^a$, the conductor 76, the contact or switch 37$^b$, and the conductor 77. This continues the energization of the relays 48' and 28$^b$.

*Circuit #3$^a$* (see Figure 9).—When the barrel 10' reaches zero position contact of switch 42' is closed completing the following circuit: the battery B', the conductor 20', the impulse relay 21', the conductor 36'', the switch 42', the conductor 46', the armature switch 78, the conductors 79 and 80, coil 28', conductor 29' contact $k'''$, barrel 10', brush 30' and the conductor 31'. This circuit energizes relays 21', 28$^b$ and 28'.

The energization of the relay 28' opens the circuit 2$^a$ at contact 37$^b$ releasing relays 28$^b$ and 48'.

The energization of the relay 21' cuts the selecting circuit across the ringing leads at contacts 61' and 66'.

The de-energization of the relay 48' closes the circuit to the ringing leads by permitting the closure of switch 71' and 74'.

*Circuit #4$^a$* (see Figure 10).—Immediately after the contact or switch 42' is closed it reopens and remains open until the barrel 10' is again at zero position, thus circuit #3$^a$ is open at contact 42' and is replaced by the following circuit which includes the battery B', the conductor 20', relay 21', conductors 36'' and 81, relay switch 82, conductor 80, coil 28', conductor 29', contact $k'''$, barrel 10', brush 30' and conductor 31'.

This circuit continues the energization of the relays 21' and 28' until the circuit is opened by contact $k'''$. Where ten instruments are employed, this means ten impulses have been sent out on the line.

*Circuit #5$^a$* (see Figure 10).—Shortly after the contact or switch 42' was closed and opened the contacts 52' and 53' close and reopen, sending out impulses on the line through the following circuit, which includes battery B$^3$, conductor 54', contact 52', conductor 55, conductor 56', armature contact 57', conductor 58', pilot relay 59', conductor 60', contact 61', conductor 73', contact 74', conductor 62', ringing contact 63', thence out on the line and return through the cord of which the operator has thrown the key, conductor 65' contact 71' conductor 72', contact 66', of coil 21', conductor 67', contact 68' of relay 28$^c$, conductor 69', contact 53' and conductor 70$^a$.

At the end of the series of impulses sent out on the line, the contact $k'''$ opens and causes the de-energization of the relays 28' and 21'.

*Circuit #6$^a$* (see Figure 8).—The de-energization of the coil 21' disconnects the selecting circuit at contacts 61' and 66' and connects the generator G' to ringing leads as follows: the generator G', the conductor 70', the contact 66', the conductor 72', the contact 71', the conductor 65' ringing contacts 63' out on line and returns through cord of which operator has thrown the key the conductor 62', the contacts 74', the conductor 73', the contact 61', and the conductor 75'.

The pilot light 45' is connected by the relay 48' through the circuit 85, the same lighting when the operator touches a button and is not extinguished until the selection is started by barrel 10' passing zero.

All other functions are identically as those shown in Figures 1 through 5.

What I claim as new is:

1. In a selective system of telephony, the combination of an exchange and a plurality of sub-stations connected electrically for the transmission of intelligence, a rotary member mounted in the exchange, a plurality of switches controlled thereby, one to each sub-station and whereby impulses are sent out on the line by the manipulation of said switches, said rotary member being adapted when controlling said switches to operate each one according to the sub-station selected and whereby a predetermined number of impulses are delivered to the line, manually controlled means for initially selecting one of the switches, electrically controlled means set in operation by the manually controlled means for continuing the operation after the manually controlled means is released, electrically controlled means for automatically opening the switches after a predetermined number of impulses have been transmitted to the line, a source of energy at the exchange for operating a call-up alarm, means controlled by the rotary member at the end of the operation thereof for connecting said source to the line at the instant the called sub-station has been selected, and a signal device at the exchange for indicating the normal operation of the exchange.

2. In a selective system of telephony, the combination in a party line telephone of an exchange and a plurality of substations, said substations all being connected in the same circuit, a selecting member at the exchange, a key at the exchange, said key being adapted to be momentarily depressed for producing the initial operation of the selecting member, and automatic means set in operation thereby to continue the selecting operation until the called sub-station is connected to the exchange.

3. In a selective system of telephony, the combination in a party line telephone of an exchange and a plurality of substations, said substations all being connected in the same circuit, a selecting member at the exchange, a key at the exchange, said key being adapted to be momentarily depressed for producing the initial operation of the selecting member, automatic means set in operation thereby to continue the selecting operation until the called substation is connected to the exchange, and the uncalled substations are shunted from the circuit.

4. In a selective system of telephony, the combination in a party line telephone of an exchange and a plurality of substations, said substations all being connected in the same circuit, a selecting member at the exchange, a key at the exchange, said key being adapted to be momentarily depressed for producing the initial operation of the selecting member, automatic means set in operation thereby to continue the selecting operation until the called substation is connected to the exchange, a call-up alarm in each substation, and means set in operation thereby for automatically operating the call-up alarm in the called substation.

5. In a selective system of telephony for party line telephones, the combination of an exchange and a plurality of sub-stations serially connected for the electrical transmission of intelligence, a lock-out device in each substation, a selecting member at the exchange, a key at the exchange for producing an initial operation of the selecting member, and means set in operation thereby to automatically continue the selecting operation until the called sub-station is connected to the exchange and the uncalled sub-stations are locked out.

6. In a selective system of telephony for party line telephones, the combination of an exchange and a plurality of sub-stations serially connected for the electrical transmission of intelligence, a lock-out device in each sub-station, a selecting member at the exchange, a key at the exchange for producing an initial operation of the selecting member, and means set in operation thereby to automatically continue the selecting operation until the called sub-station is connected to the exchange and the uncalled sub-stations are locked out, the call-up alarm in the called sub-station being actuated after the selecting operation.

7. In a selective system of telephony for party line telephones, the combination of an exchange and a plurality of sub-stations serially connected for the electrical transmission of intelligence, a lock-out device in each substation, a rotary selecting member at the exchange, a key at the exchange for producing an initial operation of the rotary selecting member, and means set in operation thereby to automatically continue the selecting operation until the called sub-station is connected to the exchange and the uncalled sub-stations are locked out.

8. In a selective system of telephony for party line telephones, the combination of an exchange and a plurality of sub-stations serially connected for the electrical transmission of intelligence, a lock-out device to each sub-station, a rotary selecting member at the exchange, a key at the exchange for producing an initial operation of the selecting member, and means set in operation thereby to automatically continue the selecting operation until the called sub-station is connected to the exchange and the uncalled sub-stations are locked out, the call-up alarm in the called substation being actuated after the selecting operation.

9. In a selective system of telephony, the combination of an exchange and a plurality of sub-stations connected electrically for the transmission of intelligence, a lock-out device in each sub-station, a rotary selecting and circuit controlling mechanism at the exchange, a key for closing one circuit thereof at a time, and automatic means at the exchange primarily set in operation by the key for continuing the selecting operation whereby the lock-out devices at the sub-stations are continued in operation and the called sub-station is connected to the exchange.

10. In a selective system of telephony, the combination of an exchange and a plurality of sub-stations connected electrically for the transmission of intelligence, a lockout device in each sub-station, a rotary selecting and circuit controlling mechanism at the exchange, a key for closing one circuit thereof at a time, and automatic means at the exchange primarily set in operation by the key for continuing the selecting operation whereby one sub-station is connected and the call-up alarm actuated and all other sub-stations are shunted from the line.

11. In a selecting system of telephony, the combination of an exchange and a plurality of sub-stations connected electrically for the transmission of intelligence, a rotary member mounted in the exchange, a plurality of switches controlled thereby, one to each sub-station, said rotary member being adapted when controlling said switches to operate each one according to the sub-station selected and whereby through said switches a predetermined number of impulses are delivered to the line, a key for initially selecting one of the switches for producing the impulses, electrically controlled means set in operation by the key for continuing the operation after the key is released, and electrically controlled means for automatically stopping the impulses when a predetermined number have been transmitted to the line.

12. In a selective system of telephony, the combination of an exchange and a plurality of sub-stations connected electrically for the transmission of intelligence, a rotary member mounted in the exchange, a plurality of switches controlled thereby, one to each sub-station, said rotary member being adapted when controlling said switches to operate each one according to the sub-station selected and whereby a predetermined number of impulses are delivered to the line, a key for initially selecting one of the switches for producing the impulses, electrically controlled means set in operation by the key for continuing the operation after the key is released, electrically controlled means for automatically stopping the impulses when a predetermined number have been transmitted to the line, a source of energy at the exchange for operating a call-up alarm, and means controlled by the rotary member at the end of its operation for connecting said source to the line at the instant the called sub-station has been selected.

13. In a selective system of telephony, the combination of an exchange and a plurality of sub-stations connected electrically for the transmission of intelligence, a rotary member mounted in the exchange, a plurality of switches controlled thereby, one to each sub-station, said rotary member being adapted when controlling said switches to operate each one according to the sub-station selected and whereby a predetermined number of impulses are delivered to the line, a key for initially selecting one of the switches for producing the impulses, electrically controlled means set in operation by the key for continuing the operation after the key is released, electrically controlled means for automatically stopping the impulses when a predetermined number have been transmitted to the line, a source of energy at the exchange for operating a call-up alarm, means controlled by the rotary member at the end of its operation for connecting said source to the line at the instant the called sub-station has been selected, and a signal device at the exchange for indicating the normal operation of the exchange.

In testimony whereof I affix my signature.

RUBEN C. M. HASTINGS.